United States Patent
Roy et al.

(10) Patent No.: US 9,430,701 B2
(45) Date of Patent: Aug. 30, 2016

(54) OBJECT DETECTION SYSTEM AND METHOD

(71) Applicant: Tata Consultancy Services Limited, Mumbai, Maharashtra (IN)

(72) Inventors: Sangheeta Roy, West Bengal (IN); Tanushyam Chattopadhyay, West Bengal (IN); Dipti Prasad Mukherjee, West Bengal (IN)

(73) Assignee: Tata Consultancy Services Limited (IN)

( * ) Notice: Subject to any disclaimer, the term of this patent is extended or adjusted under 35 U.S.C. 154(b) by 17 days.

(21) Appl. No.: 14/614,891

(22) Filed: Feb. 5, 2015

(65) Prior Publication Data

US 2015/0227784 A1 Aug. 13, 2015

(30) Foreign Application Priority Data

Feb. 7, 2014 (IN) .......................... 456/MUM/2014
Mar. 22, 2014 (IN) .......................... 949/MUM/2014

(51) Int. Cl.
*G06K 9/00* (2006.01)
*G06K 9/46* (2006.01)
(Continued)

(52) U.S. Cl.
CPC ....... *G06K 9/00369* (2013.01); *G06K 9/00201* (2013.01); *G06K 9/00771* (2013.01); *G06K 9/4638* (2013.01); *G06T 7/0081* (2013.01); *G06T 7/0093* (2013.01); *G06T 7/0097* (2013.01); *G06T 7/408* (2013.01); *G06K 2009/485* (2013.01); *G06T 2207/10024* (2013.01); *G06T 2207/10028* (2013.01); *G06T 2207/20021* (2013.01);
(Continued)

(58) Field of Classification Search
None
See application file for complete search history.

(56) References Cited

U.S. PATENT DOCUMENTS 7,813,527 B2 10/2010 Wang et al.
8,031,906 B2 10/2011 Fujimura et al.
(Continued)

FOREIGN PATENT DOCUMENTS

CN 103295016 A 9/2013
WO WO/2013/091370 6/2013

OTHER PUBLICATIONS

Reddy, Vempada Ramu, and Tanushyam Chattopadhyay. "Human activity recognition from Kinect captured data using stick model." Human-Computer Interaction. Advanced Interaction Modalities and Techniques. Springer International Publishing, Jun. 2014. 305-315.*

(Continued)

*Primary Examiner* — Tahmina Ansari
(74) *Attorney, Agent, or Firm* — Merchant & Gould P.C.

(57) ABSTRACT

Disclosed is a system and method for detecting a human in an image, and a corresponding activity. The image is captured, wherein the image comprises a plurality of pixels having gray scale information and a depth information. The image is segmented into a plurality of segments based upon the depth information. A connected component analysis is performed on a segment in order to segregate the one or more objects into noisy objects and candidate objects, the noisy objects are eliminated from the segment. A plurality of features are extracted from the candidate objects, and are evaluated using a Hidden Markov Model (HMM) model in order to determine the candidate objects as one of the human or non-human. The corresponding activity associated with the human is detected based on a depth value associated with each pixel corresponding to the candidate object in the image.

13 Claims, 11 Drawing Sheets

(51) Int. Cl.
G06T 7/00 (2006.01)
G06T 7/40 (2006.01)
G06K 9/48 (2006.01)

(52) U.S. Cl.
CPC ............... G06T 2207/20072 (2013.01); G06T 2207/30196 (2013.01); G06T 2207/30232 (2013.01)

(56) References Cited

U.S. PATENT DOCUMENTS

| | | |
|---|---|---|
| 8,611,604 B2 | 12/2013 | Fujiyoshi et al. |
| 2006/0018516 A1 | 1/2006 | Masoud et al. |
| 2010/0226564 A1* | 9/2010 | Marchesotti ...... G06F 17/30256 382/159 |

OTHER PUBLICATIONS

V. Bhuvaneshwar and P. B. Mirchandani, "Real-time detection of crossing pedestrians for traffic-adaptive signal control," Intelligent Transportation Systems, 2004. Proceedings. The 7th International IEEE Conference on, 2004, pp. 309-313. doi: 10.1109/ITSC.2004.1398916.*

Sowmiya. D, Saithevakunjari. P and AnandhaKumar. P, "Human detection in video surveillance using MBCCA: Macro Block Connected Component Algorithm," 2013 Fifth International Conference on Advanced Computing (ICoAC), Chennai, 2013, pp. 551-561.doi: 10.1109/ICoAC.2013.6922011.*

Uddin et al."Hidden Markov Models, Theory and Applications" published by InTech, Rijeka, Croatia (Mar. 2011) 326 pages.

Lin et al. "Human Activity Recognition for Video Surveillance" IEEE. (2008) pp. 2737-2740.

Spinello et al., "People detection in RGB-D data" retrieved from http://www2.informatik.uni-freiburg.de/~spinello/spinelloIROS11.pdf (Sep. 25-30, 2011) 6 pages.

Singh, "Robust Tracking and Human Activity Recognition" Thesis from University of Alberta, Edmonton, CA. Department of Electrical and Computer Engineering. (2004) 126 pages.

Spasic. "Anomaly Detection and Prediction of Human Actions in a Video Surveillance Environment" Dissertation from University of Cape Town, Department of Computer Science. (Dec. 2007) 177 pages.

* cited by examiner

OBJECT DETECTION SYSTEM AND METHOD

CROSS-REFERENCE TO RELATED APPLICATIONS AND PRIORITY

The present application claims priority from Indian patent application no. 456/MUM/2014 filed on Feb. 7, 2014 and Indian patent application no. 949/MUM/2014 filed on Mar. 22, 2014, the complete disclosure of which, in its entirety is herein incorporated by references.

BACKGROUND

1. Technical Field

The embodiments herein generally relate to image processing techniques, and, more particularly, to a detection system and method for detecting an object and an activity associated with the object.

2. Description of the Related Art

Detection of human and activities of the human for indoor and outdoor surveillance has become a major domain of research. It has been observed that, the detection of the human and the activities is very effective in applications like video indexing and retrieval, intelligent human machine interaction, video surveillance, health care, driver assistance, automatic activity detection, and predicting person behavior. Some of such applications may be utilized in offices, retail stores, or shopping malls in order to monitor/detect people (and activities of the people) present in the offices, the retail stores, or the shopping malls. It has been further observed that, the detection of the human and their corresponding activities through still images or video frames may also be possible in the indoor surveillance.

In order to detect the human and activities associated with the human in the still images or the video frames, traditional background modeling based methods have been implemented. However, such methods are not capable of detecting RGB-D/grayscale data along with other information, pertaining to each pixel in the still images or the video frames. This is because, the camera capturing the still images or the video frames is not static or there is constant variation of lighting/environmental conditions around the camera. Further, since the video frames may contain a human leaning over a wall, or the person occluding on another person, it may be challenge to distinguish the person from the wall or the other person, thereby leading to incorrect/inaccurate detection of the human and an activity corresponding to the human.

In addition, there have been other techniques implemented for detecting the human in the still images or video frames. Examples of such techniques include ace detection algorithm integrated with cascade-of-rejectors concept along with histogram of oriented gradients (HoG), window scanning technique, human detection based on body-part, hierarchical classification architecture using SVM, graphical model based approach for estimating poses of upper-body parts. However, these techniques focus on detecting one or more body parts (e.g. head, leg, arm, etc.) of the human. Additionally, these techniques require the human in the image/video frame to be localized in a predefined orientation/view, and hence are not capable of detecting the human or corresponding activities for view-invariant.

SUMMARY

Before the present systems and methods, are described, it is to be understood that this application is not limited to the particular systems, and methodologies described, as there can be multiple possible embodiments which are not expressly illustrated in the present disclosures. It is also to be understood that the terminology used in the description is for the purpose of describing the particular versions or embodiments only, and is not intended to limit the scope of the present application. This summary is provided to introduce concepts related to systems and methods for detecting a human in an image and the concepts are further described below in the detailed description. This summary is not intended to identify essential features of the claimed subject matter nor is it intended for use in detecting or limiting the scope of the claimed subject matter.

In one implementation, a system for detecting a human in at least one image is disclosed. In one aspect, the system may comprise a processor and a memory coupled to the processor for executing a plurality of modules present in the memory. The plurality of modules may further comprise an image capturing module, an analysis module, a feature extraction module, and an object determination module. The image capturing module may be configured to capture the at least one image using a motion sensing device. The at least one image may comprise a plurality of pixels having gray scale information and a depth information. The gray scale information indicates intensity of each pixel corresponding to a plurality of objects in the image. The depth information indicates distance of each object of the plurality of objects from the motion sensing device. The image capturing module may further be configured to segment the image into a plurality of segments based upon the depth information of the plurality of objects. It may be understood that, each segment of the plurality of segments may comprise a subset of the plurality of pixels, and each segment corresponds to one or more objects in the image. The analysis module may be configured to perform connected component analysis on a segment, of the plurality of segments, in order to segregate the one or more objects present in the segment. The one or more objects may be segregated into one or more noisy objects and one or more candidate objects. The analysis module may further be configured to eliminate the one or more noisy objects from the segment using a vertical pixel projection technique. The feature extraction module may be configured to extract a plurality of features from the one or more candidate objects present in the segment. It may be understood that, the plurality of features may be extracted by applying a windowing technique on the segment in order to divide the segment into one or more blocks. It may be understood that, each block of the one or more blocks comprises one or more sub-blocks. After dividing, a local gradient histogram (LGH) may be calculated corresponding to each sub-block of the one or more sub-blocks. After the calculation of the LGH, the LGH of each sub-block may then be concatenated to generate a vector comprising the plurality of features. The object determination module may be configured to evaluate the plurality of features using a Hidden Markov Model (HMM) model in order to determine the one or more candidate objects as one of the human or non-human.

The system further detects an activity of a human present in the at least one image (or a plurality of images). The plurality of modules may comprise an image processing module, the analysis module, and an activity detection module. The image capturing module may capture the plurality of images by using the motion sensing device. In one aspect, the at least one image of the plurality of images may comprise pixels. Each pixel may have a gray scale value and a depth value. The gray scale value may comprise intensity of each pixel corresponding to an object of a plurality of objects present in the image and the depth value may comprise a distance of each object from the motion sensing device. The image processing module may analyze each pixel to identify one or more candidate objects of the plurality of objects in the image by executing a background subtraction algorithm on the image in order to remove one or more noisy objects of the plurality of objects from the image. The image processing module may further compare the gray scale value of each pixel with a pre-defined gray scale value. The image processing module may further replace a subset of the pixels having the gray scale value less than the pre-defined gray scale value with 0 and a remaining subset of the pixels with 1 in order to derive a binary image corresponding to the image. The image processing module may further determine the subset as the one or more candidate objects. The analysis module (also referred herein as "an image analysis module") may perform connected component analysis on the binary image in order to detect a candidate object of the one or more candidate objects as the human. The analysis module may further retrieve the depth value associated with each pixel corresponding to the candidate object from a look-up table. The activity detection module may detect the activity of the candidate object by using the depth value or a floor map algorithm.

In another implementation, a method for detecting a human in at least one image is disclosed. The image may be captured by using a motion sensing device. The at least one image may comprise a plurality of pixels having gray scale information and a depth information. In one aspect, the gray scale information may indicate intensity of each pixel corresponding to a plurality of objects in the image and the depth information may indicate distance of each object of the plurality of objects from the motion sensing device, wherein the distance of the one or more objects in each segment is within a pre-defined threshold limit from the motion sensing device. After capturing, the image may be segmented into a plurality of segments based upon the depth information of the plurality of objects. It may be understood that, each segment of the plurality of segments may comprise a subset of the plurality of pixels, and each segment corresponds to one or more objects in the image. Subsequent to the segmentation, a connected component analysis may be performed on a segment, of the plurality of segments, in order to segregate the one or more objects present in the segment. The one or more objects may be segregated into one or more noisy objects and one or more candidate objects. Based on the connected component analysis, the one or more noisy objects may be eliminated from the segment by using a vertical pixel projection technique. After eliminating the one or more noisy objects, a plurality of features may be extracted from the one or more candidate objects present in the segment. It may be understood that, the plurality of features may be extracted by applying a windowing technique on the segment in order to divide the segment into one or more blocks. It may be understood that, each block of the one or more blocks comprises one or more sub-blocks. After dividing, a local gradient histogram (LGH) may be calculated corresponding to each sub-block. Based on the calculation of the LGH, the LGH of each sub-block may then be concatenated to generate a vector comprising the plurality of features. In one aspect, the plurality of features may then be evaluated by using a Hidden Markov Model (HMM) model in order to determine the one or more candidate objects as one of the human or non-human.

The method further detects an activity of a human present in the at least one image (or a plurality of images). In one aspect, the plurality of images may be captured by using the motion sensing device. It may be understood that, the at least one image of the plurality of images may comprise pixels. Each pixel may have a gray scale value and a depth value. The gray scale value may comprise intensity of each pixel corresponding to an object of a plurality of objects present in the image. The depth value may comprise a distance of each object from the motion sensing device. After capturing the image, each pixel may be analyzed to identify one or more candidate objects of the plurality of objects in the image by executing a background subtraction algorithm on the image in order to remove one or more noisy objects of the plurality of objects from the image. Upon execution of the background subtraction algorithm, the gray scale value of each pixel may be compared with a pre-defined gray scale value. Based on the comparison, a subset of the pixels having the gray scale value less than the pre-defined gray scale value may be replaced with 0 and a remaining subset of the pixels may be replaced with 1 in order to derive a binary image corresponding to the image. Subsequent to the replacement, the subset may be determined as the one or more candidate objects. Upon determination of the one or more candidate objects, a connected component analysis may be performed on the binary image in order to detect a candidate object of the one or more candidate objects as the human. After determining the candidate object as the human, the depth value associated with each pixel corresponding to the candidate object from a look-up table may be retrieved. Subsequent to the retrieval of the depth value, the activity of the candidate object may be detected by using the depth value or a floor map algorithm. In one aspect, the aforementioned method for detecting the activity is performed by a processor using programmed instructions stored in a memory In yet another implementation, a non-transitory computer program product having embodied thereon a computer program for detecting a human in at least one image is disclosed. The computer program product may comprise instructions for capturing the at least one image using a motion sensing device. The image may comprise a plurality of pixels having gray scale information and a depth information. The gray scale information comprises intensity of each pixel corresponding to a plurality of objects in the image, and the depth information may comprise a distance of each object of the plurality of objects from the motion sensing device. The computer program product may comprise instructions for segmenting the image into a plurality of segments based upon the depth information of the plurality of objects. It may be understood that, each segment of the plurality of segments may comprise a subset of the plurality of pixels, and each segment corresponds to one or more objects in the image. The computer program product may comprise instructions for performing connected component analysis on a segment, of the plurality of segments, in order to segregate the one or more objects, present in the segment, in one or more noisy objects and one or more candidate objects. The computer program product may comprise instructions for eliminating the one or more noisy objects from the segment using a vertical pixel projection technique. The computer program product may comprise instructions for extracting a plurality of features from the one or more candidate objects present in the segment. The plurality of features may be extracted by applying a windowing technique on the segment in order to divide the segment into one or more blocks. It may be understood that, each block of the one or more blocks comprises one or more sub-blocks, calculating a local gradient histogram (LGH)

corresponding to each sub-block of the one or more sub-blocks, concatenating the LGH of each sub-block, and generating a vector comprising the plurality of features based on the concatenation. The computer program product may comprise instructions for evaluating the plurality of features using a Hidden Markov Model (HMM) model in order to determine the one or more candidate objects as one of the human or non-human.

The non-transitory computer readable medium embodies the program when executed in the computing device further detects an activity of a human present in the at least one image (or a plurality of images). The program may comprise a program code for capturing the plurality of images using a motion sensing device. The image of the plurality of images may comprise pixels. In one aspect, each pixel may have a gray scale value and a depth value. The gray scale value may comprise intensity of each pixel corresponding to an object of a plurality of objects present in the image. The depth value may comprise a distance of each object from the motion sensing device. The program may further comprise a program code for analyzing each pixel to identify one or more candidate objects of the plurality of objects in the image. The program code for the analyzing further comprises executing a background subtraction algorithm on the image in order to remove one or more noisy objects of the plurality of objects from the image. The program code for the analyzing further comprises comparing the gray scale value of each pixel with a pre-defined gray scale value. The program code for the analyzing further comprises replacing a subset of the pixels having the gray scale value less than the pre-defined gray scale value with 0 and a remaining subset of the pixels with 1 in order to derive a binary image corresponding to the image. The program code for the analyzing further comprises determining the subset as the one or more candidate objects. The program may further comprise a program code for performing a connected component analysis on the binary image in order to detect a candidate object of the one or more candidate objects as the human. The program may further comprise a program code for retrieving the depth value associated with each pixel corresponding to the candidate object from a look-up table. The program may further comprise a program code for detecting the activity of the candidate object by using the depth value or a floor map algorithm.

These implementations and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration. The summary is not intended to identify essential features of the claimed subject matter nor is it intended for use in determining or limiting the scope of the claimed subject matter. Changes and modifications may be made within the scope of the embodiments herein.

BRIEF DESCRIPTION OF THE DRAWINGS

The foregoing detailed description of embodiments is better understood when read in conjunction with the appended drawings. For the purpose of illustrating the disclosure, there is shown in the present document example constructions of the disclosure; however, the disclosure is not limited to the specific methods and apparatus disclosed in the document and the drawings.

The detailed description is described with reference to the accompanying figures. In the figures, the left-most digit(s) of a reference number identifies the figure in which the reference number first appears. The same numbers are used throughout the drawings to refer like features and components.

DETAILED DESCRIPTION OF PREFERRED EMBODIMENTS

Figure 1:
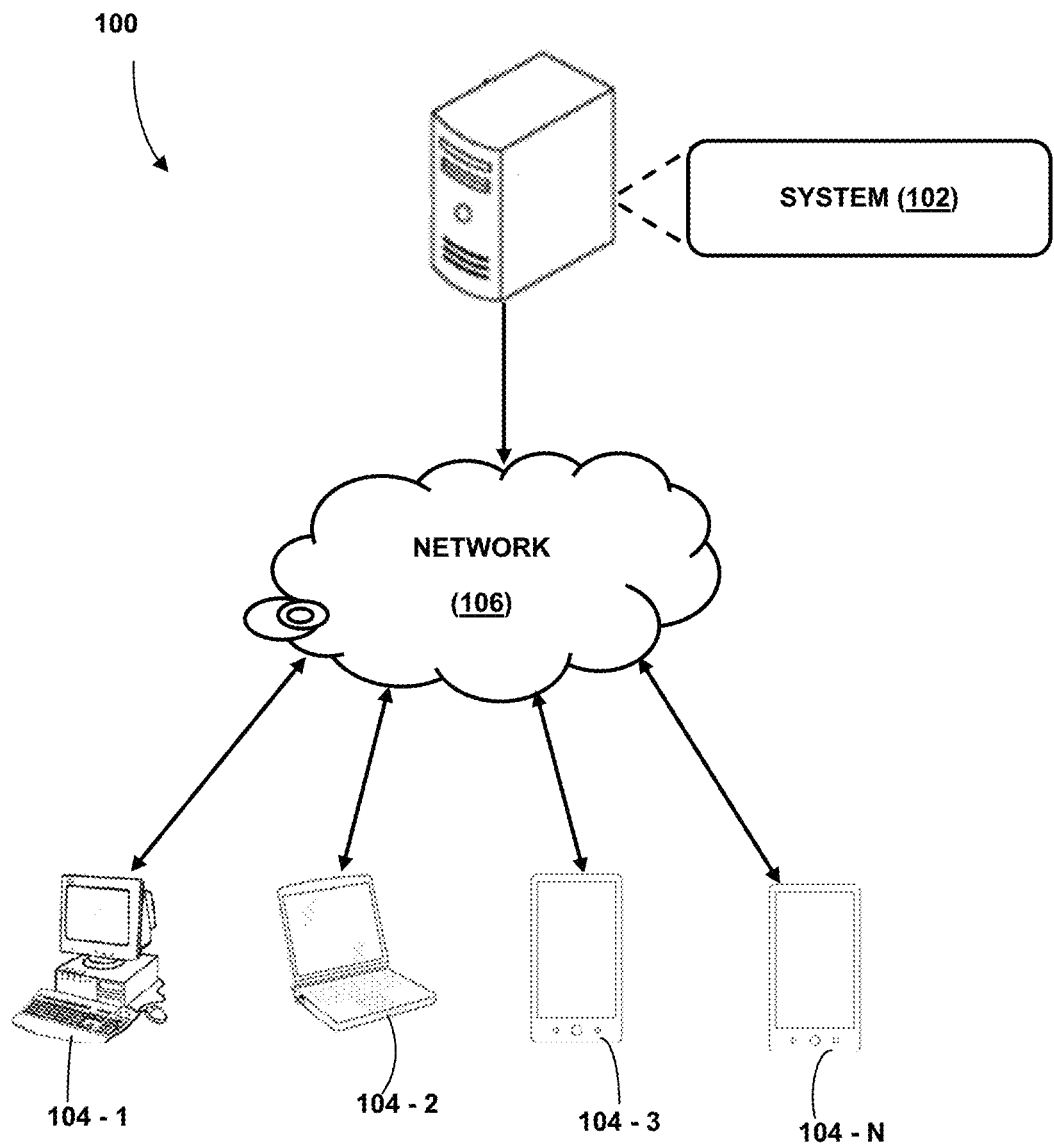
FIG. 1 illustrates a network implementation of a system for detecting a human in an image, in accordance with an embodiment of the present subject matter.

Some embodiments of this disclosure, illustrating all its features, will now be discussed in detail. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise. Although any systems and methods similar or equivalent to those described herein can be used in the practice or testing of embodiments of the present disclosure, the exemplary, systems and methods are now described. The disclosed embodiments are merely exemplary of the disclosure, which may be embodied in various forms.

Various modifications to the embodiment will be readily apparent to those skilled in the art and the generic principles herein may be applied to other embodiments. However, one of ordinary skill in the art will readily recognize that the present disclosure is not intended to be limited to the embodiments illustrated, but is to be accorded the widest scope consistent with the principles and features described herein.

The present subject matter provides system and method for detecting a human from a plurality of objects present in an image. In one aspect, the image may be captured by a motion sensing device. In one example, the motion sensing device may be a Kinect™ device. It may be understood that, the image captured, by the Kinect™ device, may comprise a plurality of pixels having gray scale information and depth information. The gray scale information indicates intensity of each pixel corresponding to the plurality of objects, and the depth information indicates distance of each object from the Kinect™ device.

After capturing the image, the image may be segmented into a plurality of segments based upon the depth information associated to the plurality of objects in the image. It may be understood that, each segment comprises a subset of the plurality of pixels. In one aspect, each segment corresponds to one or more objects of the plurality of objects in the image. In one embodiment, the image may be segmented by maintaining the gray scale information of the subset, and transforming the gray scale information of the remaining pixels (not belonging to the subset) of the image into a black color.

After segmenting the image into the plurality of segments, a connected component analysis may be performed on a segment of the plurality of segments. The connected component analysis may facilitate to segregate the one or more objects present in the segment. The one or more objects may be segregated into one or more noisy objects and one or more candidate objects. Examples of the one or more noisy objects may include, but not limited to, ceiling, wall, and floor. Examples of the one or more candidate objects may include, but not limited to, a human, a chair, a refrigerator. After the segregation of the one or more objects, the one or more noisy objects may be eliminated from the segment using a vertical pixel projection technique. In one aspect, the vertical pixel projection may eliminate the one or more noisy objects by using a K-Means algorithm.

Subsequent to the elimination of the one or more noisy objects, a plurality of features may be extracted from the one or more candidate objects present in the segment. In one embodiment, the plurality of features may be extracted by implementing a sliding windowing technique on the segment. In one aspect, the sliding windowing technique may provide a rectangular sliding window while traversing across the segment in order to obtain one or more window frames. The one or more frames are indicative of one or more blocks of the segment. Thus, the implementation of the sliding windowing technique may enable division of the segment into one or more blocks. It may be understood that, each block of the one or more blocks comprises one or more sub-blocks. After dividing the segment, a local gradient histogram (LGH) may be calculated for a pre-defined set of orientations corresponding to each sub-block. Based on the calculation, the LGH of each sub-block may be concatenated in order to generate a vector comprising the plurality of features.

After extracting the plurality of features from the segment, the plurality of features may be evaluated by using a Hidden Markov Model (HMM) model in order to determine the one or more candidate objects as one of the human or non-human. In one aspect, the one or more candidate objects may be determined as one of the human or the non-human based on the evaluation of state transition sequence of the plurality of features with a sequence of features pre-stored in a database. It may be understood that, the one or more candidate objects may be determined as one of the human or the non-human by using a Viterbi algorithm.

The present subject matter further discloses the system and method for detecting an activity of a human present in the at least one image (or a plurality of images). In one aspect, the plurality of images may refer to a sequence of a video frames hereinafter referred to as the 'plurality of images' of a video (or a media). It may be understood that, the plurality of images may include a plurality of objects such as a living object or a non-living object. Thus, in order to detect the activity corresponds to the living object (i.e. a human) in the video, the system and the method, initially, may capture the plurality of images using a motion sensing device. Example of the motion sensing device may include, but not limited to, a Kinect™ device. It may be understood that, an image of the plurality of images may comprise pixels. Each pixel may have a gray scale value and a depth value. The gray scale value indicates intensity of each pixel corresponding to an object of the plurality of objects present in the image. The depth value indicates a distance of each object from the Kinect™ device. In one embodiment, one or more pixels of the pixels may include some noise resulting into non-inclusion of the depth value while the image is captured by the Kinect™ device. Thus, a nearest neighbor interpolation algorithm may be implemented for de-noising the one or more pixels in order to retain the depth value associated to the one or more pixels.

Subsequent to the capturing of the plurality of images, each pixel may be analyzed to identify one or more candidate objects of the plurality of objects in the image. It may be understood that, the one or more candidate objects may be identified by eliminating one or more noisy objects from the plurality of objects. In one aspect, the one or more noisy objects may be eliminated by using a background subtraction algorithm or a vertical pixel projection technique. Examples of the one or more candidate objects may include, but not limited to, the human, a chair, and a table. Examples of the one or more noisy objects may include, but not limited to, a ceiling, a wall, and a floor. Subsequent to the elimination of the one or more noisy objects, the gray scale value of each pixel may be compared with a pre-defined gray scale value, and then a subset of the pixels having the gray scale value less than the pre-defined gray scale value may be replaced with 0 and a remaining subset of the pixels may be replaced with 1 in order to derive a binary image corresponding to the image. After determining the one or more candidate objects, a connected component analysis may be performed on the binary image in order to detect a candidate object of the one or more candidate objects as the living object (i.e. the human).

Since the binary image does not include the depth value of the pixels therefore, in order to detect the activity of the candidate object, the depth value associated with each pixel corresponding to the candidate object may be retrieved from a look-up table. In one aspect, the look-up table may store the depth value corresponding to each pixel present in the image. Thus, based on the depth value, the activity of the candidate object may be detected as one of a walking, a standing, a sleeping, and a sitting using at least one of an average depth value of the one or more pixels, a floor map algorithm and the depth value.

While aspects of described system and method for detecting the activity of the human present in the plurality of images may be implemented in any number of different computing systems, environments, and/or configurations, the embodiments are described in the context of the following exemplary system.

Referring now to FIG. 1, a network implementation 100 of a system 102 for detecting a human and an activity associated with the human in at least one image is illustrated, in accordance with an embodiment of the present subject matter. In one embodiment, the system 102 may be configured to capture the at least one image. It is to be understood that multiple images may be captured by the system 102. In one aspect, the image may comprise a plurality of pixels having gray scale information and a depth information. The gray scale information indicates intensity of each pixel corresponding to a plurality of objects in the image, and the depth information indicates distance of each object of the plurality of objects from the motion sensing device. After capturing the image, the system 102 may further be configured to segment the image into a plurality of segments.

Based on the segmentation, the system 102 may further be configured to perform a connected component analysis on a segment, of the plurality of segments, in order to segregate the one or more objects into one or more noisy objects and one or more candidate objects. Subsequent to the performance of the connected component analysis on the segment, the system 102 may further be configured to eliminate the one or more noisy objects from the segment. After eliminating the one or more noisy objects, the system 102 may further be configured to extract a plurality of features from the one or more candidate objects present in the segment. Subsequent to the extraction of the plurality of features, the system 102 may further be configured to evaluate the plurality of features in order to determine the one or more candidate objects as one of the human or non-human.

As described, the system 102 may capture a plurality of images by using a motion sensing device. In one aspect, an image of the plurality of images may comprise pixels. Each pixel may have a gray scale value and a depth value. The gray scale value may comprise intensity of each pixel corresponding to an object of a plurality of objects present in the image and the depth value may comprise a distance of each object from the motion sensing device. The system 102 may further analyze each pixel to identify one or more candidate objects of the plurality of objects in the image by executing a background subtraction algorithm on the image in order to remove one or more noisy objects of the plurality of objects from the image. The system 102 may further compare the gray scale value of each pixel with a pre-defined gray scale value. The system 102 may further replace a subset of the pixels having the gray scale value less than the pre-defined gray scale value with 0 and a remaining subset of the pixels with 1 in order to derive a binary image corresponding to the image. The system 102 may further determine the subset as the one or more candidate objects. The system 102 may further perform connected component analysis on the binary image in order to detect a candidate object of the one or more candidate objects as the human. The system 102 may further retrieve the depth value associated with each pixel corresponding to the candidate object from a look-up table. The system 102 may further detect the activity of the candidate object as one of a walking, a standing, a sleeping, a sitting, or combinations thereof. In one aspect, the walking or standing may be detected by computing an average depth value of one or more pixels of the pixels in the image. The one or more pixels may be associated to the candidate object. The system 102 may further identify the activity of the candidate object as the walking when difference of the average depth value of the one or more pixels in the image and the average depth value of the one or more pixels in a subsequent image of the image is greater than a predefined threshold value. Alternatively, the system 102 may identify the activity of the candidate object as the standing. In another aspect, when the activity of the candidate object is identified as the standing, the system 102 may further detect the activity as the sleeping or the sitting by using a floor map algorithm and the depth value.

Although the present subject matter is explained considering that the system 102 is implemented on a server, it may be understood that the system 102 may also be implemented in a variety of computing systems, such as a laptop computer, a desktop computer, a notebook, a workstation, a mainframe computer, a network server, a cloud-based computing environment and the like. In one implementation, the system 102 may be implemented in a cloud-based environment. It will be understood that the system 102 may be accessed by multiple users through one or more user devices 104-1, 104-2 . . . 104-N, collectively referred to as user devices 104 hereinafter, or applications residing on the user devices 104. Examples of the user devices 104 may include, but are not limited to, a portable computer, a personal digital assistant, a handheld device, and a workstation. The user devices 104 are communicatively coupled to the system 102 through a network 106.

In one implementation, the network 106 may be a wireless network, a wired network or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

Figure 2:
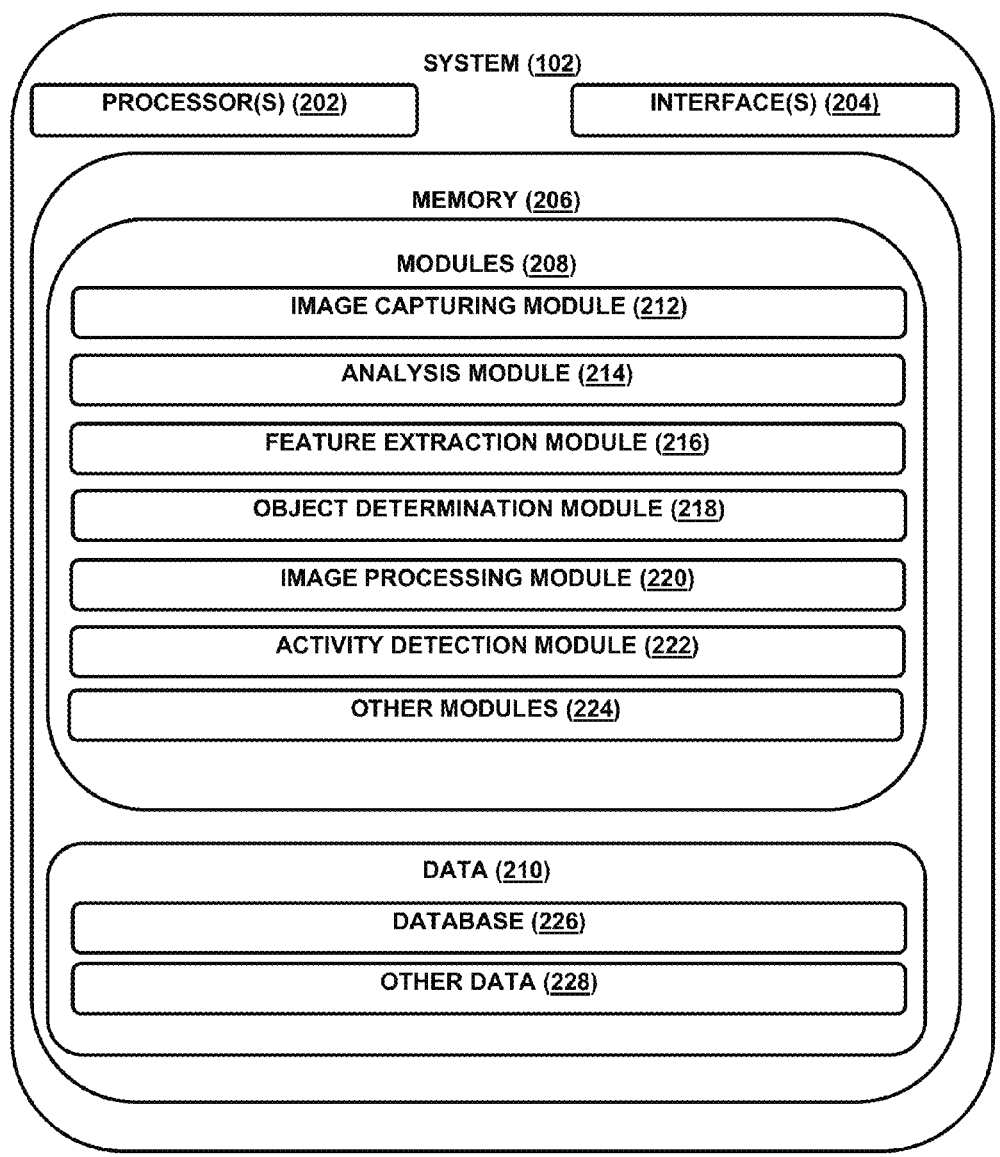
FIG. 2 illustrates the system, in accordance with an embodiment of the present subject matter.

Referring now to FIG. 2, the system 102 is illustrated in accordance with an embodiment of the present subject matter. In one embodiment, the system 102 may include at least one processor 202, an input/output (I/O) interface 204, and a memory 206. The at least one processor 202 may be implemented as one or more microprocessors, microcomputers, microcontrollers, digital signal processors, central processing units, state machines, logic circuitries, and/or any devices that manipulate signals based on operational instructions. Among other capabilities, the at least one processor 202 is configured to fetch and execute computer-readable instructions stored in the memory 206.

The I/O interface 204 may include a variety of software and hardware interfaces, for example, a web interface, a graphical user interface, and the like. The I/O interface 204 may allow the system 102 to interact with the user directly or through the client devices 104. Further, the I/O interface 204 may enable the system 102 to communicate with other computing devices, such as web servers and external data servers (not shown). The I/O interface 204 can facilitate multiple communications within a wide variety of networks and protocol types, including wired networks, for example, LAN, cable, etc., and wireless networks, such as WLAN, cellular, or satellite. The I/O interface 204 may include one or more ports for connecting a number of devices to one another or to another server.

The memory 206 may include any computer-readable medium or computer program product known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 206 may include modules 208 and data 210.

The modules 208 include routines, programs, objects, components, data structures, etc., which perform particular tasks, functions or implement particular abstract data types. In one implementation, the modules 208 may include an image capturing module 212, an analysis module 214, a feature extraction module 216, an object determination module 218, an image processing module 220, an activity detection module 222, and other modules 224. The other modules 224 may include programs or coded instructions that supplement applications and functions of the system 102. The modules 208 described herein may be implemented as software modules that may be executed in the cloud-based computing environment of the system 102. The modules 208 are implemented as a self-contained hardware components that may be executed in the system 102.

The data 210, amongst other things, serves as a repository for storing data processed, received, and generated by one or more of the modules 208. The data 210 may also include a database 226 and other data 228. The other data 228 may include data generated as a result of the execution of one or more modules in the other modules 224.

In one implementation, at first, a user may use the client device 104 to access the system 102 via the I/O interface 204. The user may register themselves using the I/O interface 204 in order to use the system 102. In one aspect, the user may accesses the I/O interface 204 of the system 102. In order to detect a human in an image, the system 102 may employ the image capturing module 212, the analysis module 214, the feature extraction module 216, and the object determination module 218. The detailed working of the plurality of modules is described below.

Further referring to FIG. 2, at first, the image capturing module 212 captures the image by using a motion sensing device. Example of the motion sensing device may include a Kinect™ device. It may be understood that, the Kinect™ device is capable of capturing the image along with metadata associated to the image. The metadata may include gray scale information and depth information pertaining to a plurality of objects in the image. In one aspect, the gray scale information may indicate intensity of each pixel corresponding to the plurality of objects in the image, whereas the depth information may indicate distance of each object of the plurality of objects from the Kinect™ device. In one example, the image, captured by the image capturing module 212 may comprise objects such as a human, a refrigerator, a chair. It may be understood that, the objects (i.e. the human, the refrigerator, or the chair) may be located at distinct locations in an indoor environment. Since the objects are located at distinct locations, the image capturing module 212 determines the depth information along with gray scale information of each object in the image.

Subsequent to the capturing of the image, the image capturing module 212 may further segment the image into a plurality of segments. The image may be segmented based upon the depth information of the plurality of objects present in the image. In one embodiment, the image may be segmented by using a depth connected operator ($\psi$). The '$\psi$' may be represented as the depth connected operator when the symmetrical difference P$\Delta$ $\psi$ (D) is exclusively composed of connected components of 'D' or compliment of the connected component '$D^C$'. It may be understood that, the depth information represented by the depth connected operator '$\psi$' obtained from the Kinect™ may be applied over each pixel in order to segment the image into the plurality of segments. In one aspect, each segment of the plurality of segments may comprise a subset of the plurality of pixels. In one aspect, each pixel is having the distance within a pre-defined threshold value. Since each segment comprises the subset having the distance within the pre-defined threshold value, therefore it may be understood that, a segment of the plurality of segments may comprise one or more objects, of the plurality of objects, corresponding to the subset.

In one embodiment, the image may be segmented by maintaining the gray scale information of the subset, and transforming the gray scale information of the remaining pixels (not belonging to the subset) of the image into a black color. It may be understood that, the gray scale information of the subset is maintained since each pixel in the subset may have the distance within the pre-defined threshold value. On the other hand, the gray scale information of the another subset are transformed since each pixel in the another subset may not have the distance within the pre-defined threshold value. Thus, subsequent to the transformation, the image capturing module 212 may segment the image into the plurality of segments.

Figure 3:
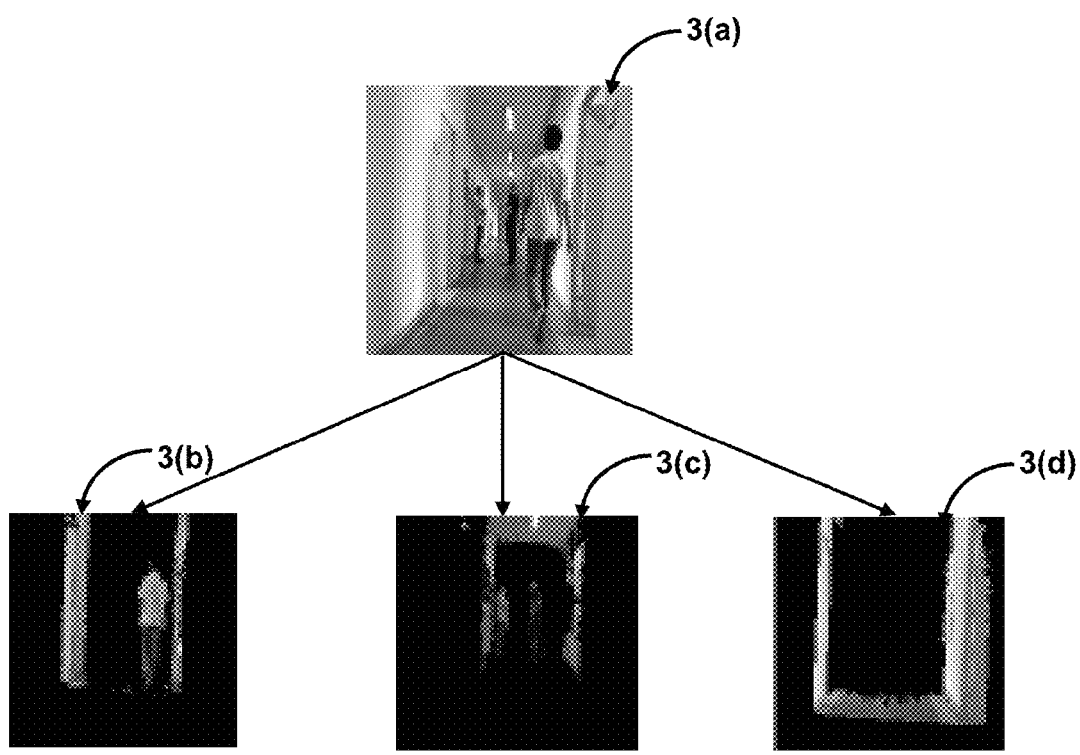
FIGS. 3 and 4(a) and 4(b) illustrates working of the system, in accordance with an embodiment of the present subject matter.

In order to understand the segmentation of the image into the plurality of segments, consider an example (1) in which a video frame/image is segmented into 3 segments. As illustrated in the FIG. 3(*a*), a person X is walking towards another two persons (person Y and person Z) that are standing away from the person X. In addition to the presence of the person X, the person Y and the person Z, an object (i.e. a door) is also present in the video frame/image. Based on the functionality of the image capturing module 212, as aforementioned, the image capturing module 212 determines the depth information along with gray scale information of each object (i.e. person X, person Y, person Z and the door) present in the video frame/image. Based on the depth information, the video frame/image is segmented into 3 segments as illustrated in FIGS. 3(*b*), 3(*c*), and 3(*d*). Since, it is determined from the depth information that, the distance of the person X is distinct from the person Y, the person Z and the door, therefore, the person X is segmented into a first segment, as shown in FIG. 3(*b*). On the other hand, the distance of the person Y and the person Z are within the threshold value but distinct from the person X and the door, therefore both the person Y and the person Z are classified into a second segment, as shown in FIG. 3(*c*). Similarly, the object (i.e. the door) is located at distinct location from the person X, the person Y, and the person Z, therefore the door is segmented into a third segment, as shown in FIG. 3(*d*). As shown in the FIGS. 3(*b*), 3(*c*) and 3(*d*), the gray scale information of the one or more objects in the segment are maintained whereas the background color in the segments are marked as black in order to highlight the one or more objects in the segment.

Subsequent to the segmentation of the image, the analysis module 214 may perform a connected component analysis on the segment of the plurality of segments. In one aspect, the connected component analysis may facilitate to segregate the one or more objects, present in the segment, into one or more noisy objects and one or more candidate objects. Examples of the one or more noisy objects may include, but not limited to, ceiling, wall, and floor. Examples of the one or more candidate objects may include, but not limited to, a human, a chair, and a refrigerator. Based on the segregation of the one or more objects, the one or more noisy objects may be eliminated from the segment using a vertical pixel projection technique. In one embodiment, the vertical pixel projection technique may include the following steps:

If the width of an object of the one or more objects in the segment is greater than 75% of the width of the image, then execute the following steps for eliminating the one or more noisy objects:

Count a number of pixels ($cnt_i$) in a column 'i' for which the background color in the segment to be transformed as 'black' or assigning a value to a flag as 'FALSE', wherein the flag indicates the background color to be transformed as 'Black';

Execute a K-Means algorithm clustering with value of K=2 on $cnt_i$ $\forall i \in 0;H$ where H indicates height of the image;

The output of the K-Means algorithm represents columns with higher number of Fore Ground pixels (C1) and lower number of Fore Ground pixels (C2); and Assigning the value to the flag for the number of pixels ($cnt_i$) in the column that is resided in C2 as 'TRUE'.

Figure 4A:
Figure 4B:

In order to understand the working of the analysis module 214, consider an example (2), in which a video frame/image, as illustrated in FIG. 4(a), comprising a person X and a door. Since the video frame/image is captured in the indoor environment, the video frame/image may also consist of the one or more noisy objects such as floor and ceiling. In order to eliminate the floor and the ceiling, the aforesaid vertical pixel projection may be applied on the video frame/image. In this manner, based on the vertical pixel projection, the floor and the ceiling are eliminated and the one or more candidate objects (i.e. the person X and the door) are retained in the video frame/image, as illustrated in FIG. 4(b).

Subsequent to the elimination of the one or more noisy objects, the feature extraction module 216 may extract a plurality of features from the one or more candidate objects present in the segment. It may be understood that, the plurality of features may be extracted by calculating a local gradient histogram (LGH). In order to calculate the LGH, a sliding windowing technique may be implemented on the segment. In one aspect, the sliding windowing technique provides a rectangular sliding window while traversing across the segment in order to obtain one or more window frames. The one or more window frames are indicative of one or more blocks of the segment. In an exemplary embodiment, the feature extraction module 216 may further divide each block of the one or more blocks into a matrix of (4×4) sub-blocks. After dividing the one or more blocks, the LGH may be calculated of each sub-block for a predefined set of orientations. Subsequent to the calculation of the LGH for each sub-block, the feature extraction module 216 may further concatenate the LGH calculated for each sub-block of the one or more blocks associated to the segment. Based on the concatenation, the feature extraction module 216 generates a vector comprising the plurality of features of the segment.

In one example (3), consider a segment, of the image, comprising the one or candidate objects. Based on the functionality of the feature extraction module 216, as aforementioned, the sliding windowing technique may be implemented on the segment that facilitates in dividing the segment into 8 blocks. Further, each block of the 8 blocks are divided into a matrix of (4×4) sub-blocks. In other words, it may be understood that, each block comprises 16 sub-blocks. After dividing each block, the LGH may be calculated of each sub-block for a predefined set of orientations (for example '8' orientations) and therefore, it is to be understood that, 128 features may be calculated for each block of the segment. After calculating the LGH, the feature extraction module 216 concatenates the LGH for each sub-block in order to generate the vector comprising the plurality of features corresponding to the one or candidate objects present in the segment.

After extracting the features, the object determination module 218 evaluates the plurality of features using a Hidden Markov Model (HMM) model of a plurality of HMM models. In one embodiment, the plurality of features may be evaluated to determine the one or more candidate objects as one of the human or non-human. It may be understood that, the one or more candidate objects may be determined as one of the human or the non-human based on the evaluation of state transition sequence of the plurality of features with a sequence of features pre-stored in a database 222. It may be understood that, the sequence of features may be extracted from a large sample of images that may be used in training the HMM model. It may be understood that, the training facilitates in determining the one or more candidate objects as one of the human or the non-human. Once the HMM model have been trained, a Viterbi algorithm may be used to determine the one or more candidate objects as the human or the non-human. It may be understood that, the Viterbi algorithm have been implemented in Hidden Markov model speech recognition toolkit (HTK) library.

In another embodiment, the object determination module 218 may further evaluates the plurality of features by using one or more HMM models of the plurality of HMM models in order to determine one or more activities corresponding to an object, of the one or more candidate objects, determined as the human. Examples of the one or more activities may include, but not limited to, standing, sitting, walking, or combinations thereof. It may be understood that, in order to determine each activity, distinct HMM models may be trained based on a plurality of features corresponding to each activity. It may be understood that, the plurality of features may be trained based on the large sample of images corresponding to each activity. Thus, the training of the distinct HMM models may facilitate in determining the one or more activities as one of the standing, sitting walking, or combinations thereof. In one aspect, the object determination module 218 may determine the one or more activities of the human in the image for view-invariant.

In one embodiment, the functionality of the object determination module 218 for determining the one or more candidate objects as the human or the non-human is explained as below. It may be understood that, the HMM follows a first-order Markov assumption where each state $S_t$ at time 't' depends only on the state $S_{t-1}$ at time 't−1'. It may be understood that, the image observation feature vectors constitute the sequence of states. Each class is modeled by a left-to-right HMM where each state has transition to itself and next state. In one aspect, the HMM may contain a fixed number of hidden states. The HMM is characterized by 3 matrices i.e. state transition probability matrix A, symbol output probability matrix B, and initial state probability matrix Π. The state transition probability matrix A, the symbol output probability matrix B, and initial state probability matrix Π may be determined during a learning process. It may be understood that, the image may be represented as a sequence of feature vectors X=X1, X2 . . . XT also known as sequence of frames. For a model $\lambda$, if 'O' is an observation sequence O=(O1, O2 . . . OT). It may be understood that, the observation sequence O generates a state sequence Q=(Q1, Q2 . . . QT), of length T. The observation sequence O may be calculated by:

$$P(O, Q | \lambda) = \sum_Q \pi_{q1} b_{q1}(O_1) \prod_T a_{qT-1}qTb_{qT}(O_T),$$

where $\Pi_{q1}$ indicates initial probability of state 1, transition probability from state 'i' to state 'j' and is output probability of state 'i'. In one aspect, the observation may be computed by using a Gaussian Mixture Model (GMM). The GMM includes $$b_j(x) = \sum_{k=1}^{M_j} c_{jk} \mathcal{N}\left(x, \mu_{jk}, \sum_{jk}\right),$$

where, $M_j$ indicates number of Gaussians assigned to j and $N(x, \mu, \sigma)$ denotes a Gaussian with mean '$\mu$' and covariance matrix '$\sigma$' and '$c_{jk}$' is the weight coefficient of the Gaussian component 'k' of state 'j'. Further, the Viterbi algorithm is used to decode and search the subsequence of the observation that matches best to the HMM.

Further referring to FIG. 2, in order to detect an activity associated with the detected human in the image, the system 102 further employs the image processing module 220, and the activity detection module 222. The detailed working of the plurality of modules is described below.

At first, as described above, the image is captured by using the motion sensing device. Since the plurality of objects present in the image may be located at distinct location, therefore the image capturing module 212 may determine the depth value along with gray scale value of each object in the image. In one embodiment, at least one pixel of the pixels associated to the image, captured by the Kinect™ device, may include some noise resulting into non-inclusion of the depth value. In one aspect, the noise indicates that the at least one pixel are appearing in 'black' color due to non-presence of the depth value. Thus, in order to retain the depth value associated to the at least one pixel, the image processing module 220 may de-noise the at least one pixel in order to retain the depth value associated to the at least one pixel. In one aspect, the depth value corresponding to the at least one pixel may be de-noised by using a nearest neighbor interpolation algorithm in which at least one pixel may be de-noised when the depth value of the at least one pixel, bounded by one or more other pixels of the pixels, is not within a pre-defined depth value of the one or more pixels.

Figure 5A:
FIG. 5(a)-5(d) illustrates an example, in accordance with an embodiment of the present disclosure.
Figure 5B:
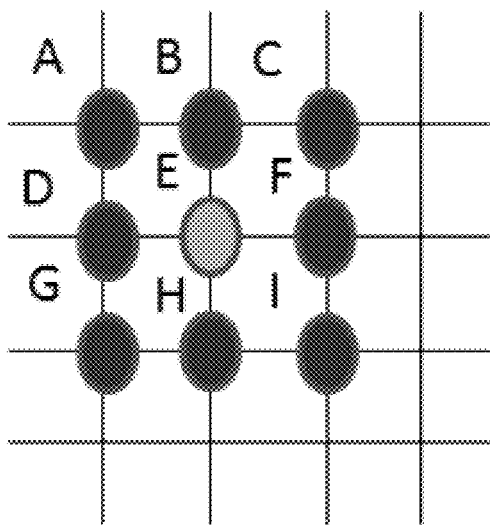

In order to understand the working of the nearest neighbor interpolation algorithm, consider an image captured by the Kinect™ device as illustrated in FIG. 5(a), where a pixel i.e. 'E' is bounded by the one or more other pixels i.e. 'A', 'B', 'C', 'D', 'F', 'G', 'H', and 'I'. In one aspect, 'A', 'B', 'C', 'D', 'E', 'F', 'G', 'H', and 'I' indicates 9 pixels corresponding an object present in the image. It may be observed from the image, that 'E' includes the depth value as 'null', therefore it is considered as noise in the image. In order to retain the depth value corresponding to a pixel i.e. 'E', the image processing module 220 may implement the nearest neighbor interpolation algorithm on the image. In one aspect, the nearest neighbor interpolation algorithm may use a formulation as mentioned below in order to determine the average of the one or more other pixels that are bounded by the pixel 'E'.

$$D(i, j) = I_E(i, j) = \frac{1}{P} \sum_{m=i-1, m \neq i}^{i+1} \sum_{n=i+1, n \neq j}^{j+1} I(m, n),$$

Since, the one or more other pixels including 'A', 'B', 'C', 'D', 'F', 'G', 'H', and 'I', therefore the image processing module 220 may determine an average of the depth value corresponding to the one or more other pixels (i.e. 'A', 'B', 'C', 'D', 'F', 'G', 'H', and 'I'). Based on the determination of the average, the image processing module 220 may substitute the average of the depth value to the depth value corresponding to the pixel 'E'. In this manner, the noise pertaining to the pixel 'E' in the image may be de-noised.

Figure 5C:

Subsequent to the capturing of the plurality of images, image processing module 220 may analyze each pixel to identify one or more candidate objects of the plurality of objects in the image. Example of the one or more candidate objects may include, but not limited to, a human, a chair, and a table. In order to identify the one or more candidate objects, the image processing module 220 may execute a background subtraction algorithm on the image in order to remove one or more noisy objects of the plurality of objects as illustrated in FIG. 5(c). Examples of the one or more noisy objects may include, but not limited to, a ceiling, a wall, and a floor. In one aspect, the background subtraction algorithm is a technique in the field of an image processing wherein a foreground of the image may be extracted for further processing. The foreground of the image may indicate the one or more candidate objects are present in the image. In one aspect, the background subtraction algorithm is a used widely in the art for detecting the plurality of objects in an image frame captured from a video.

After executing the background subtraction algorithm, the image processing module 220 may further compare the gray scale value of each pixel, corresponding to the one or more candidate objects, with a pre-defined gray scale value. In one aspect, the pre-defined gray scale value is 2. Upon comparing the gray scale value of each pixel with the pre-defined gray scale value, the image processing module 220 may further replace a subset of the pixels having the gray scale value less than the pre-defined gray scale value with '0' and a remaining subset of the pixels with '1' in order to derive a binary image corresponding to the image. In one aspect, '0' indicates the subset of the pixels is turned into 'black' in color having the gray scale value of '0', whereas '1' indicates the remaining subset of the pixels is turned into 'white' in color having the gray scale value as '255'. Thus, in this manner, the subset of the pixels (assigned with '0' in the binary image) having the gray scale value lesser than the pre-defined gray scale value may be determined as the one or more candidate objects.

Figure 5D:
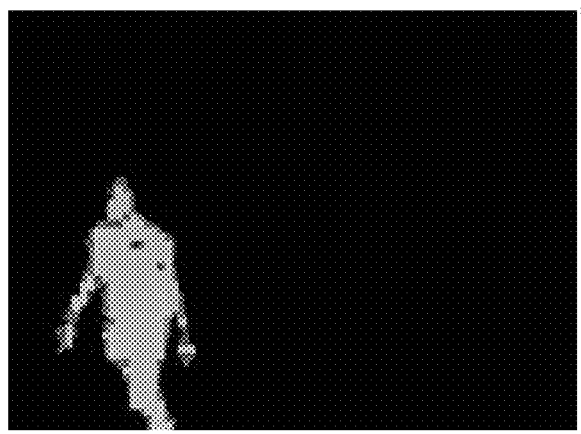

Since the binary image may contain numerous imperfections and noise, therefore the analysis module 214 may perform morphological image processing in order to remove the imperfections and the noise. In one aspect, the analysis module 214 may perform a connected component analysis and morphological operations on the binary image in order to detect a candidate object of the one or more candidate objects as the human. It may be understood that, the candidate object may be detected by removing the imperfections and the noise from the binary image by using the connected component analysis and morphological operations as illustrated in the FIG. 5(d). Examples of the morphological operations may include, but not limited to, Erosion, Dilation, Opening, and Closing. After performing the connected component analysis, the analysis module 214 may further retrieve the depth value associated with each pixel corresponding to the candidate object from a look-up table. In one aspect, the depth value may be retrieved by creating a mask of the binary image. The mask may facilitate to retrieve the depth value of each pixel associated to the subset of the pixels present in the binary image. It may be understood that, the depth value of each pixel of the remaining subset of the pixels in the binary image assigned with non-zero (i.e., 1) is unchanged, whereas the depth value of each pixel of the subset of the pixels (detected as the candidate object) in the binary mask assigned with 0 is retrieved using the look-up table stored in a database 226. In one aspect, the look-up table stores the depth value corresponding to each pixel present in the image.

After retrieving the depth value, the activity detection module 222 may detect the activity of the candidate object present in the image by using the depth value or a floor map algorithm. In one embodiment, the activity may be detected as one of, but not limited to, a walking, a standing, a sleeping, a sitting, or combinations thereof. However, it may be understood that, the aforementioned method may also facilitate to detect other activities than the walking, the standing, the sleeping, the sitting, or the combinations thereof based on the depth value or the floor map algorithm.

In one embodiment, the activity of the candidate object may be detected as the walking or the standing by computing an average depth value of one or more pixels of the pixels in the image. It may be understood that, the one or more pixels may be associated to the candidate object. In one aspect, subsequent to the computation of the average depth value, the activity of the candidate object may be identified as the walking when difference of the average depth value of the one or more pixels in the image and the average depth value of the one or more pixels in a subsequent image of the image is greater than a predefined threshold value. In another aspect, the activity of the candidate object may be identified as the standing, the sleeping or the sitting when difference of the average depth value of the one or more pixels in the image and the average depth value of the one or more pixels in the subsequent image of the image is less than the predefined threshold value. In one aspect, the predefined threshold value is 20. It is to be understood from the aforementioned description that when difference of the average depth value of the one or more pixels in the image and the average depth value of the one or more pixels in the subsequent image of the image is greater than 20, then the activity is detected as the walking otherwise the activity may be detected as one of the standing, the sitting or the sleeping. In one aspect, if the activity is not detected as the walking, then it is be understood that the candidate object is in no motion since the difference between the average depth value of the one or more pixels in the image and the average depth value of the one or more pixels in the subsequent image of the image is within the predefined threshold value i.e. 20. Thus, upon determining the candidate object is in no motion in most of the images amongst the plurality of images, the activity may be detected as one of the standing, the sitting or the sleeping.

In one example, the average depth value over a sequence of frames (i.e. n+4) may be computed, where 'n' indicates a first frame of the sequence. Further, the average depth value for the 'nth' frame and the subsequent frame of the 'nth' frame (i.e. n+1 frame) are computed by using a below formulation $$d_n = \Sigma_{i,j} \text{depth\_Mask}(i,j), d_{n+1} = \Sigma_{i,j} \text{depth\_Mask}(i,j)$$

Therefore, the average depth value for a (n+2) frame, a (n+3) frame and a (n+4) frame are indicated by $d_{n+2}$, $d_{n+1}$, $d_{n+1}$. Further, based on the below formulation:

$$\text{if} |d_n - d_{n+1}| > o2 \text{ then Walking, else, Standing, Sitting or sleeping}$$

It may be understood that, if most of the frames among 5 frames are greater than predefined threshold value (i.e. 20), then the activity of the candidate object present in the sequence of frames is detected as the "walking", otherwise the activity is detected as one of the "standing", the "sitting", or the "sleeping".

In order to detect the activity as one of the standing, the sitting or the sleeping, the activity detection module 222 may use the floor map algorithm and the depth value. In one aspect, if the person spatial location is within a predefined sofa or bed position, the activity detection module 222 may use the floor map algorithm in order to detect the activity as the sitting. Further, the activity detection module 222 may extract features corresponding to the candidate object. A commonly known technique called look-up table (LUT) is used to map the depth value of the one or more pixels corresponding to the candidate object. It may be understood that, a histogram may be produced by matching the depth value with a bin using the look-up table (LUT). The look-up table may store an intensity transformation function. The intensity transformation may generate some specific output values of the corresponding input values. Those output value are quantized to number of bins. In one aspect, the number of bins is particularly evident in having some activities like the sleeping, which are generated by the depth value of the candidate object. In one aspect, if the activity of the candidate object in the images is detected as the sleeping, then it is to be understood that a depth distribution or the depth space by the candidate object is more than the depth distribution detected in the activity like the standing or the walking Thus based on the aforementioned logic, the depth distribution for 5 frames may be calculated. Further, it may be understood that, if the depth distribution of most of the frames among the 5 frames are greater than the number of bins, then it is to be understood that, the activity of the candidate object in the sequence of frames is detected as the sleeping. Otherwise the activity of the candidate object in the sequence of frames is detected as the standing. In one example, when the depth distribution is greater than 5 out of 8 bins, then the activity is detected as the sleeping otherwise the activity is detected as the standing.

Exemplary embodiments discussed above may provide certain advantages. Though not required to practice aspects of the disclosure, these advantages may include those provided by the following features.

Some embodiments enable a system and a method for detecting upper body part as well as other body parts of a human present, and corresponding one or more activities in the image.

Some embodiments enable the system and the method for view-invariance human detection by using a Hidden Markov model (HMM) approach.

Some embodiments enable the system and the method to detect the human during improper segmentation of a segment of the image and further when the human is partially occluded by other object and human.

Some embodiments enable the system and the method to segment the image into a plurality of segments in order to recognize the presence of human in each segment based on depth information pertaining to an object in each segment, and thereby further detect one or more activities.

Figure 6:
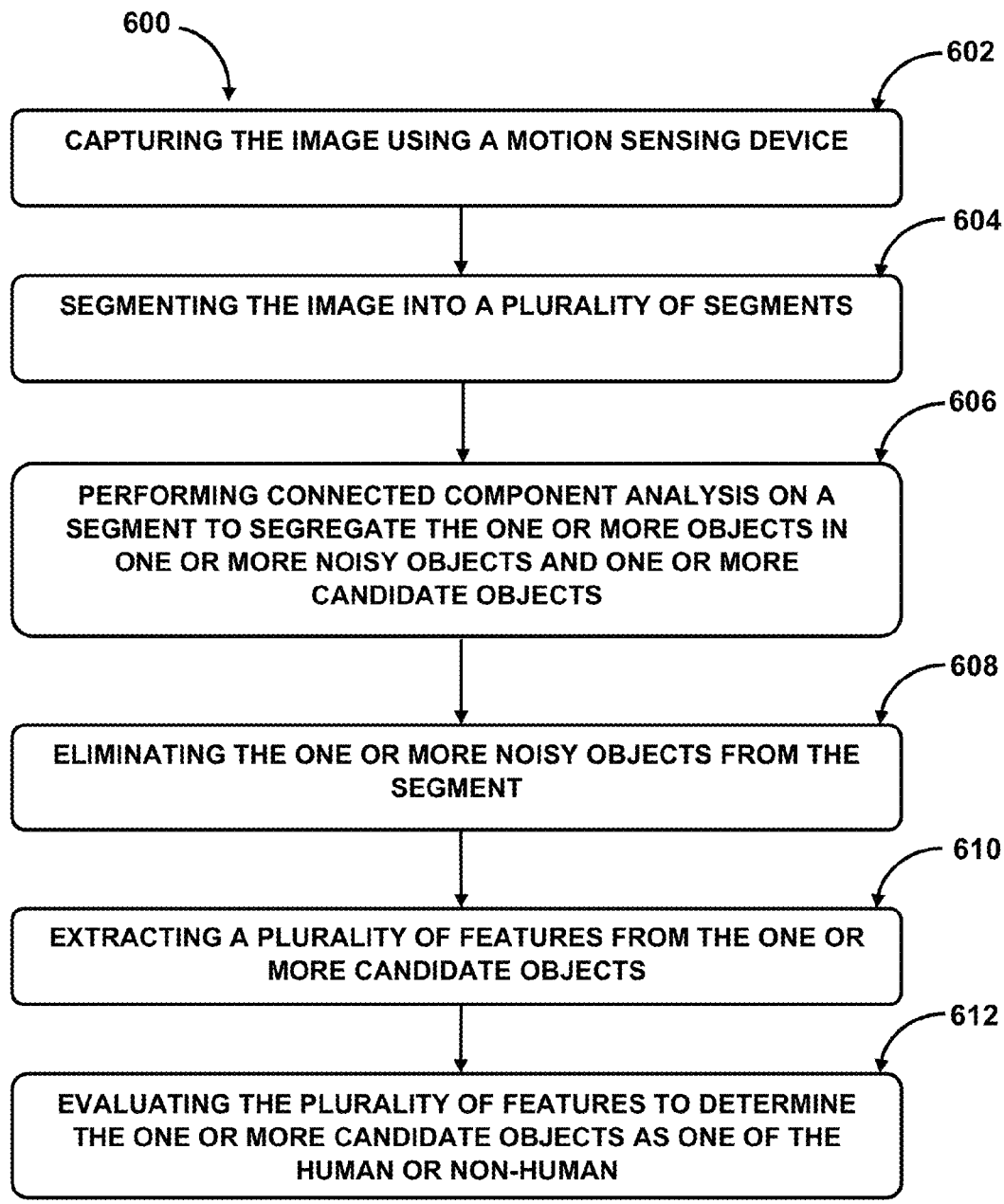
FIG. 6 illustrates a method for detecting the human in the image, in accordance with an embodiment of the present subject matter.

Referring now to FIG. 6, a method 600 detecting a human in an image is shown, in accordance with an embodiment of the present subject matter. The method 600 may be described in the general context of computer executable instructions. Generally, computer executable instructions can include routines, programs, objects, components, data structures, procedures, modules, functions, etc., that perform particular functions or implement particular abstract data types. The method 600 may also be practiced in a distributed computing environment where functions are performed by remote processing devices that are linked through a communications network. In a distributed computing environment, computer executable instructions may be located in both local and remote computer storage media, including memory storage devices.

The order in which the method 600 is described is not intended to be construed as a limitation, and any number of the described method blocks can be combined in any order to implement the method 600 or alternate methods. Additionally, individual blocks may be deleted from the method 600 without departing from the spirit and scope of the subject matter described herein. Furthermore, the method can be implemented in any suitable hardware, software, firmware, or combination thereof. However, for ease of explanation, in the embodiments described below, the method 500 may be considered to be implemented as described in the system 102.

At block 602, the image may be captured by using a motion sensing device. In one aspect, the image comprises a plurality of pixels having gray scale information and depth information. In one implementation, the image may be captured by the image capturing module 212. At block 604, the image may be segmented into a plurality of segments based upon the depth information. In one aspect, each segment of the plurality of segments may comprise a subset of the plurality of pixels, and each segment corresponds to one or more objects in the image. In one implementation, the image may be segmented into a plurality of segments by the image capturing module 212.

At block 606, a connected component analysis may be performed on each segment in order to segregate the one or more objects, present in the segment, into one or more noisy objects and one or more candidate objects. In one implementation, the connected component analysis may be performed by the analysis module 214. At block 608, the one or more noisy objects may be eliminated from the segment by using a vertical pixel projection technique. In one implementation, the one or more noisy objects may be eliminated by the analysis module 214. At block 610, a plurality of features may be extracted from the one or more candidate objects present in the segment. In one implementation, the plurality of features may be extracted by the feature extraction module 216. Further, the block 610 may be explained in greater detail in FIG. 7.

At block 612, the plurality of features may be evaluated to determine the one or more candidate objects as one of the human or non-human. In other words, detecting a human or a non-human from the one or more candidate objects based on the plurality of features. In one aspect, the plurality of features may be evaluated by using a Hidden Markov Model (HMM) model. In one implementation, the plurality of features may be evaluated by the object determination module 218.

Figure 7:
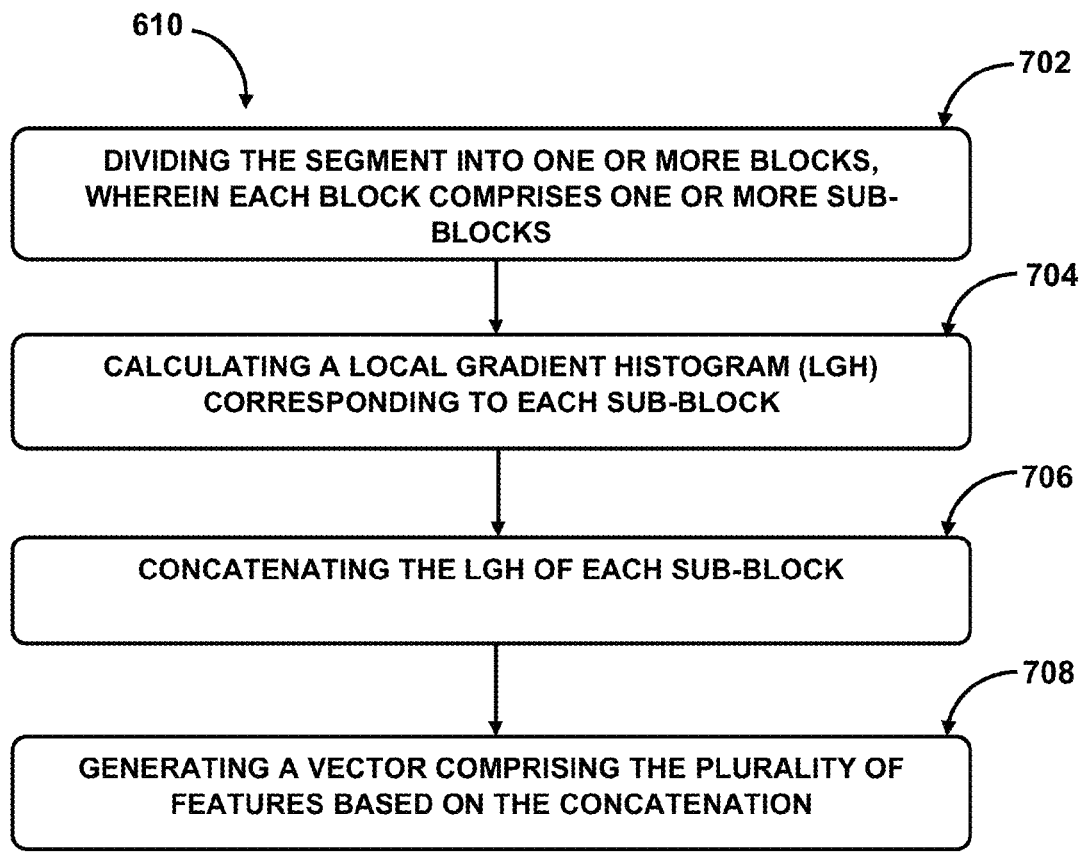
FIG. 7 illustrates a method for extracting a plurality of features, in accordance with an embodiment of the present subject matter.

Referring now to FIG. 7, a method 610 for extracting the plurality of features from the one or more candidate objects is shown, in accordance with an embodiment of the present subject matter. At block 702, the segment may be divided into one or more blocks, wherein each block of the one or more blocks comprises one or more sub-blocks. In one embodiment, the segment may be divided by applying a windowing technique on the segment. In one implementation, the segment may be divided by the feature extraction module 216. At block 704, a local gradient histogram (LGH) corresponding to each sub-block of the one or more sub-blocks may be calculated. In one implementation, the LGH may be calculated by the feature extraction module 216.

At block 706, the LGH of each sub-block may be concatenated. In one implementation, the LGH of each sub-block may be concatenated by the feature extraction module 216. At block 708, a vector comprising the plurality of features may be generated. In one aspect, the vector may be generated based on the concatenation. In other words, a vector comprising the plurality of features is generated by concatenating the LGH of each sub-block. In one implementation, the vector may be generated by the feature extraction module 216.

Figure 8:
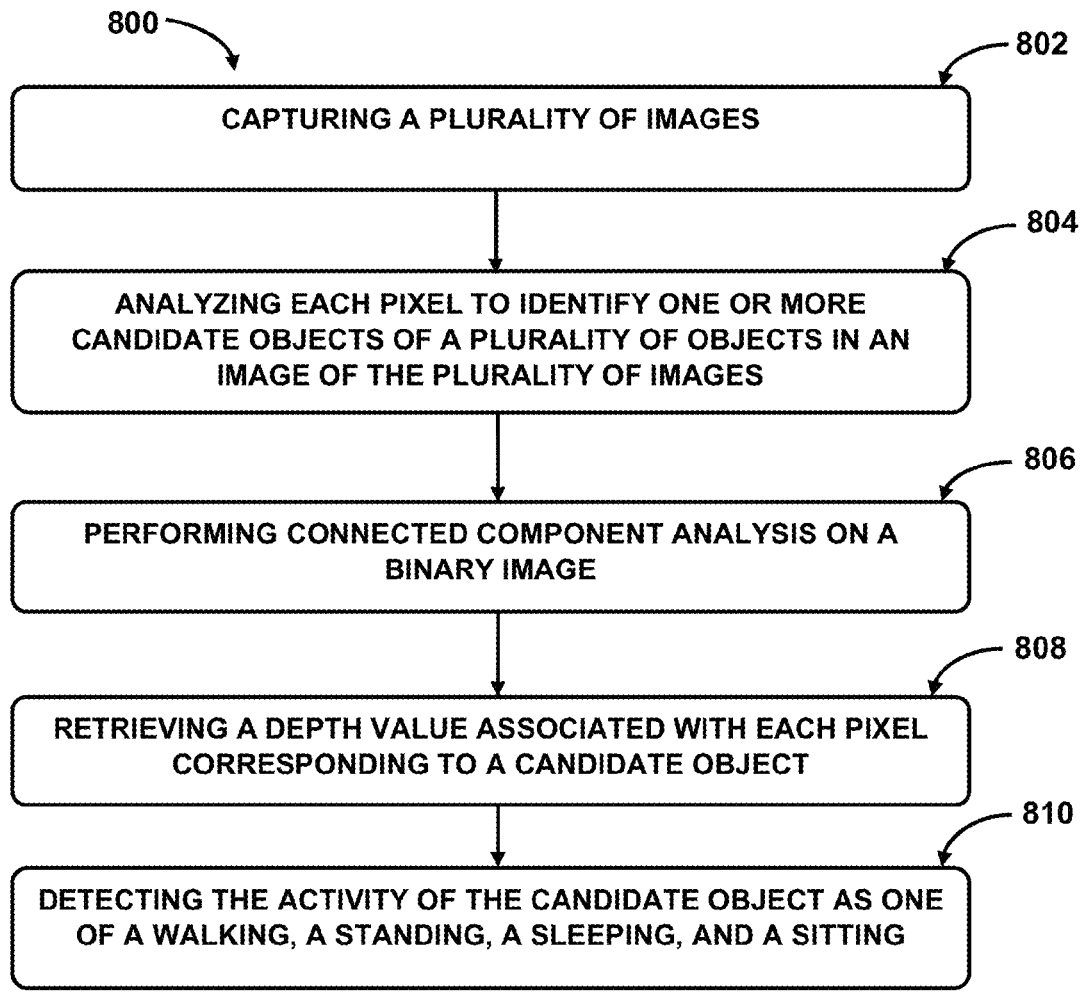
FIGS. 8, 9 and 10 illustrates a method for detecting the activity of the human present in the at least one image or the plurality of images, in accordance with an embodiment of the present disclosure.

Referring now to FIG. 8, a method 800 for detecting an activity of a human present in the at least one image (or a plurality of images) is shown, in accordance with an embodiment of the present disclosure. The method 800 may be described in the general context of computer executable instructions. Generally, computer executable instructions can include routines, programs, objects, components, data structures, procedures, modules, functions, etc., that perform particular functions or implement particular abstract data types. The method 800 may be practiced in a distributed computing environment where functions are performed by remote processing devices that are linked through a communications network. In a distributed computing environment, computer executable instructions may be located in both local and remote computer storage media, including memory storage devices.

The order in which the method 800 is described is not intended to be construed as a limitation, and any number of the described method blocks can be combined in any order to implement the method 800 or alternate methods. Additionally, individual blocks may be deleted from the method 800 without departing from the spirit and scope of the disclosure described herein. Furthermore, the method can be implemented in any suitable hardware, software, firmware, or combination thereof. However, for ease of explanation, in the embodiments described below, the method 800 may be considered to be implemented in the above described in the system 102.

At block 802, the at least one image (or the plurality of images) may be captured by using a motion sensing device. In one aspect, an image of the plurality of images may comprise pixels, and each pixel may have a gray scale value and a depth value. The gray scale value may comprise intensity of each pixel corresponding to an object of a plurality of objects present in the image, and the depth value may comprise a distance of each object from the motion sensing device. In one implementation, the plurality of images may be captured by the image capturing module 212.

At block 804, each pixel may be analyzed to identify one or more candidate objects of the plurality of objects in the image. In one implementation, each pixel may be analyzed by the image processing module 220. Further, the block 404 may be explained in greater detail in FIG. 9. At block 806, a connected component analysis may be performed on a binary image in order to detect a candidate object of the one or more candidate objects as the human. In one aspect, the binary image may be derived from the image as explained below in FIG. 5. In one implementation, the connected component analysis may be performed by the analysis module 214.

At block 808, the depth value associated with each pixel corresponding to the candidate object may be retrieved from a look-up table. In one implementation, the depth value may be retrieved by the analysis module 214. At block 810, the activity of the candidate object may be detected as one of a walking, a standing, a sleeping, and a sitting. In one implementation, the activity of the candidate object may be detected by the activity detection module 222. Further, the block 810 may be explained in greater detail in FIG. 10.

Figure 9:
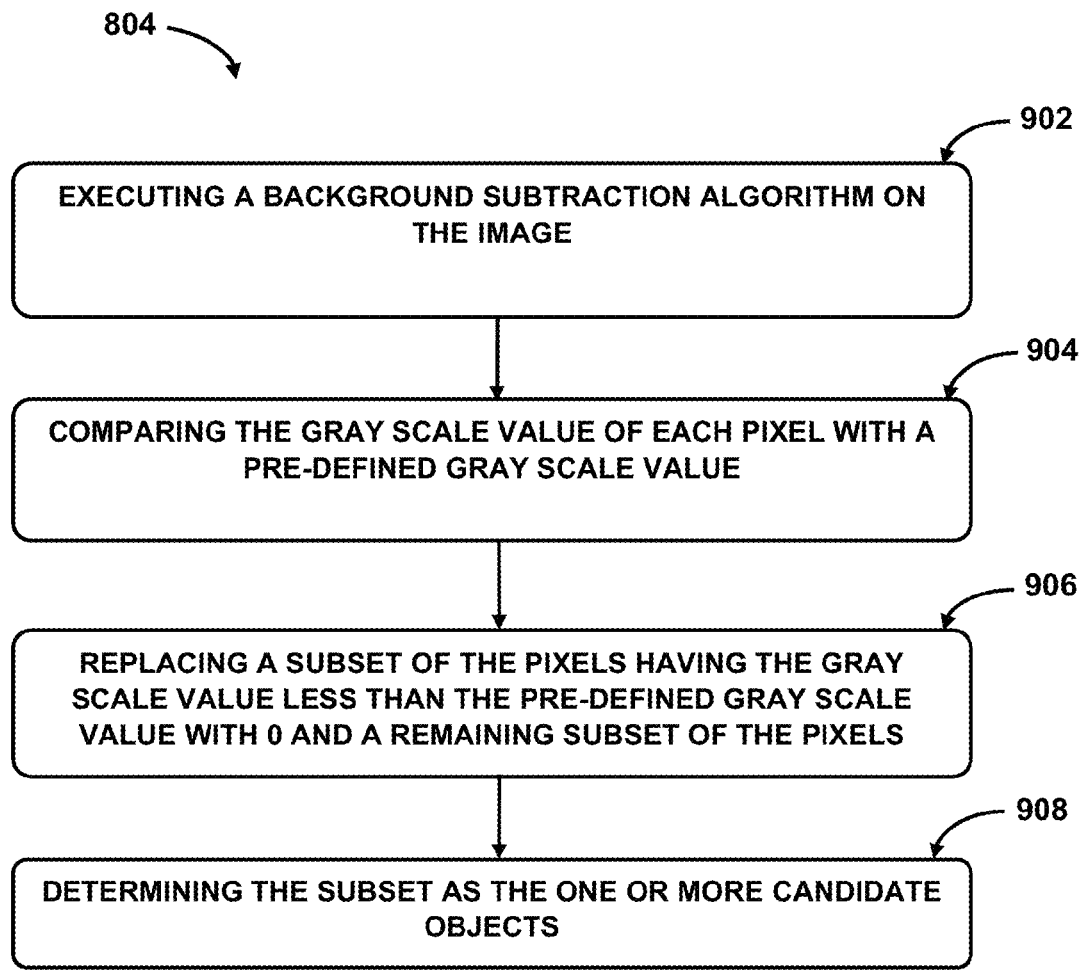

Referring now to FIG. 9, the block 804 for analyzing each pixel to identify one or more candidate objects of the plurality of objects in the image is shown, in accordance with an embodiment of the present subject matter. At block 902, a background subtraction algorithm may be executed on the image in order to remove one or more noisy objects of the plurality of objects from the image. In one implementation, the background subtraction algorithm may be executed by the image processing module 220. At block 904, the gray scale value of each pixel may be compared with a pre-defined gray scale value. In one implementation, the gray scale value of each pixel may be compared with the pre-defined gray scale value by the image processing module 220.

At block 906, a subset of the pixels having the gray scale value less than the pre-defined gray scale value may be replaced with 0 and a remaining subset of the pixels may be replaced with 1 in order to derive a binary image corresponding to the image. In one implementation, the subset and the remaining subset are replaced by the image processing module 220. At block 908, the subset may be determined as the one or more candidate objects. In one implementation, the subset may be determined as the one or more candidate objects by the image processing module 220.

Figure 10:
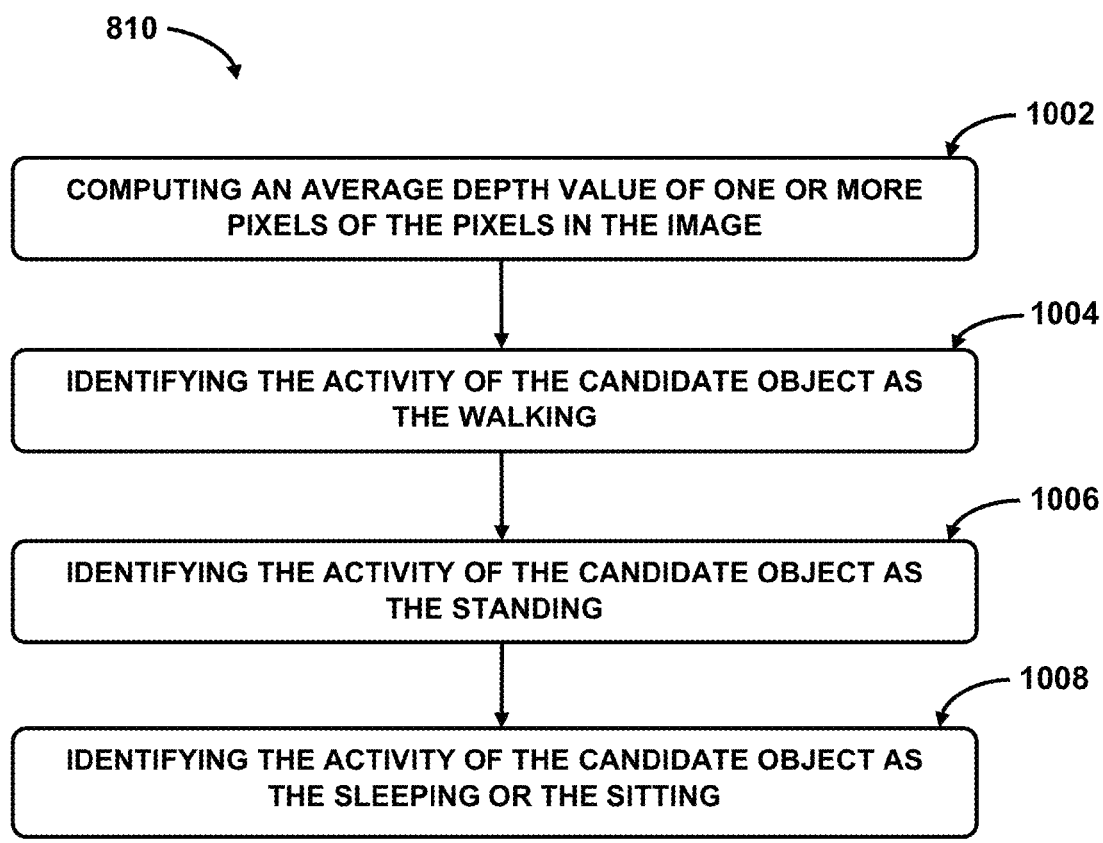

Referring now to FIG. 10, the block 810 for detecting the activity of the candidate object as one of the walking, the standing, the sleeping, and the sitting is shown, in accordance with an embodiment of the present subject matter. At block 1002, an average depth value of one or more pixels of the pixels in the image may be computed. In one aspect, the one or more pixels may be associated to a candidate object of the one or more candidate objects. In one implementation, the average depth value of one or more pixels of the pixels in the image may be computed by the activity detection module 222. At block 1004, the activity of the candidate object may be identified as the walking when difference of the average depth value of the one or more pixels in the image and the average depth value of the one or more pixels in a subsequent image of the image is greater than a predefined threshold value. In one implementation, the activity of the candidate object as the walking may be identified by the activity detection module 222.

At block 1006, the activity of the candidate object may be identified as the standing when difference of the average depth value of the one or more pixels in the image and the average depth value of the one or more pixels in the subsequent image of the image is less than the predefined threshold value. In one implementation, the activity of the candidate object may be identified as the standing by the activity detection module 222. At block 1008, the activity of the candidate object may be detected as the sleeping or the sitting subsequent to the detection of the activity of the candidate object as the standing. In one aspect, the activity of the candidate object may be detected as the sleeping or the sitting by using a floor map algorithm and the depth value. In one implementation, the activity of the candidate object may be detected as the sleeping or the sitting by the activity detection module 222.

Although implementations for methods and systems for detecting an activity of a human present in a plurality of images have been described in language specific to structural features and/or methods, it is to be understood that the appended claims are not necessarily limited to the specific features or methods described. Rather, the specific features and methods are disclosed as examples of implementations for detecting the activity of the human present in the plurality of images.

The written description describes the subject matter herein to enable any person skilled in the art to make and use the embodiments of the invention. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

We claim:

1. A method for detecting a human in at least one image, the method comprising:
    capturing at least one image using a motion sensing device, wherein the at least one image comprises a plurality of pixels having gray scale information and a depth information, and wherein the gray scale information comprises intensity of each pixel corresponding to a plurality of objects in the at least one image, and wherein the depth information comprises a distance information between each object and the motion sensing device;
    segmenting, by a processor, the at least one image into a plurality of segments based on the depth information of the plurality of objects, wherein each segment of the plurality of segments comprises a subset of the plurality of pixels, and each segment corresponds to one or more objects in the at least one image;
    performing a connected component analysis on a segment of the plurality of segments to obtain one or more noisy objects and one or more candidate objects;
    eliminating the one or more noisy objects from the segment using a vertical pixel projection technique;
    extracting a plurality of features from the one or more candidate objects present in the segment, wherein the plurality of features are extracted by,
        applying a windowing technique on the segment in order to divide the segment into one or more blocks, wherein each block of the one or more blocks comprises one or more sub-blocks,
        calculating a local gradient histogram (LGH) corresponding to each sub-block of the one or more sub-blocks, and
        generating a vector comprising the plurality of features by concatenating the LGH of each sub-block; and
    detecting a human or a non-human from the one or more candidate objects based on the plurality of features.

2. The method of claim 1, wherein the segmenting further comprises:
    maintaining the gray scale information of the subset of the plurality of pixels; and
    transforming the gray scale information of remaining pixels other than the subset into a black color.

3. The method of claim 1, wherein the human or the non-human are detected from the one or more candidate objects based on an evaluation of a state transition sequence of the plurality of features with a sequence of features pre-stored in a database.

4. The method of claim 1, wherein the plurality of features are evaluated by using a Hidden Markov Model (HMM) to detect the human or the non-human from the one or more candidate objects.

5. The method of claim 1, further comprising detecting one or more activities associated with the human in the at least one image by:
    analyzing each pixel of the one or more candidate objects in the at least one image by, comparing the gray scale value of each pixel with a pre-defined gray scale value,
replacing a subset of the pixels having the gray scale value less than the pre-defined gray scale value with 0 and a remaining subset of the pixels with 1 in order to derive a binary image corresponding to the at least one image, and
determining the subset as the one or more candidate objects in the binary image;
performing a connected component analysis on the binary image in order to detect a candidate object of the one or more candidate objects as the human;
retrieving the depth value associated with each pixel corresponding to the candidate object from a look-up table; and
detecting an activity of the candidate object by using the depth value or a floor map algorithm.

6. The method of claim 5, further comprising de-noising each pixel in order to retain the depth value associated with each pixel using a nearest neighbor interpolation algorithm, wherein each pixel is de-noised when the depth value of each pixel bounded by the one or more pixels are not within a pre-defined depth value of the one or more pixels.

7. The method of claim 5, wherein the activity comprises any of a walking, a standing, a sitting, a sleeping, or combinations thereof.

8. A system for detecting a human in at least one image, the system comprising:
a processor; and
a memory coupled to the processor, wherein the processor is capable of executing a plurality of modules stored in the memory, and wherein the plurality of modules comprising:
an image capturing module configured to:
capture at least one image using a motion sensing device, wherein the at least one image comprises a plurality of pixels having gray scale information and a depth information, and wherein the gray scale information comprises intensity of each pixel corresponding to a plurality of objects in the at least one image, and wherein the depth information comprises a distance information between each object and the motion sensing device,
segment the at least one image into a plurality of segments based on the depth information of the plurality of objects, wherein each segment of the plurality of segments comprises a subset of the plurality of pixels, and each segment corresponds to one or more objects in the at least one image,
perform a connected component analysis on a segment of the plurality of segments to obtain one or more noisy objects and one or more candidate objects, and
eliminate the one or more noisy objects from the segment using a vertical pixel projection technique,
a feature extraction module that is configured to extract a plurality of features from the one or more candidate objects present in the segment, wherein the plurality of features are extracted by,
applying a windowing technique on the segment in order to divide the segment into one or more blocks, wherein each block of the one or more blocks comprises one or more sub-blocks,
calculating a local gradient histogram (LGH) corresponding to each sub-block of the one or more sub-blocks, and
generating a vector comprising the plurality of features by concatenating the LGH of each sub-block; and
an object determination module that is configured to detect a human or a non-human from the one or more candidate objects based on the plurality of features.

9. The system of claim 8, further comprising
an image processing module that is configured to analyze each pixel of the one or more candidate objects in the at least one image by,
comparing the gray scale value of each pixel with a pre-defined gray scale value,
replacing a subset of the pixels having the gray scale value less than the pre-defined gray scale value with 0 and a remaining subset of the pixels with 1 in order to derive a binary image corresponding to the at least one image, and
determining the subset as the one or more candidate objects in the binary image;
performing the connected component analysis on the binary image in order to detect a candidate object of the one or more candidate objects as the human; and
retrieving the depth value associated with each pixel corresponding to the candidate object from a look-up table; and
an activity detection module that is configured to detect one or more activities of the candidate object by using the depth value or a floor map algorithm.

10. A non-transitory computer program product having embodied thereon a computer program for detecting a human in at least one image by performing the step of:
capturing at least one image using a motion sensing device, wherein the at least one image comprises a plurality of pixels having gray scale information and a depth information, and wherein the gray scale information comprises intensity of each pixel corresponding to a plurality of objects in the at least one image, and wherein the depth information comprises a distance information between each object and the motion sensing device;
segmenting, by a processor, the at least one image into a plurality of segments based on the depth information of the plurality of objects, wherein each segment of the plurality of segments comprises a subset of the plurality of pixels, and each segment corresponds to one or more objects in the at least one image;
performing a connected component analysis on a segment of the plurality of segments to obtain one or more noisy objects and one or more candidate objects;
eliminating the one or more noisy objects from the segment using a vertical pixel projection technique;
extracting a plurality of features from the one or more candidate objects present in the segment, wherein the plurality of features are extracted by,
applying a windowing technique on the segment in order to divide the segment into one or more blocks, wherein each block of the one or more blocks comprises one or more sub-blocks,
calculating a local gradient histogram (LGH) corresponding to each sub-block of the one or more sub-blocks, and
generating a vector comprising the plurality of features by concatenating the LGH of each sub-block; and
detecting a human or a non-human from the one or more candidate objects based on the plurality of features.

11. The non-transitory computer program product of claim 10, wherein the one or more instructions, which when executed by the one or more processors further causes
  detecting one or more activities associated with the human in the at least one image
    by: analyzing each pixel of the one or more candidate objects in the at least one image by,
      comparing the gray scale value of each pixel with a pre-defined gray scale value,
      replacing a subset of the pixels having the gray scale value less than the pre-defined gray scale value with 0 and a remaining subset of the pixels with 1 in order to derive a binary image corresponding to the at least one image, and
      determining the subset as the one or more candidate objects in the binary image;
  performing a connected component analysis on the binary image in order to detect a candidate object of the one or more candidate objects as the human;
  retrieving the depth value associated with each pixel corresponding to the candidate object from a look-up table; and
  detecting an activity of the candidate object by using the depth value or a floor map algorithm.

12. The non-transitory computer program product of claim 11, wherein the one or more instructions, which when executed by the one or more processors further causes de-noising each pixel in order to retain the depth value associated with each pixel using a nearest neighbor interpolation algorithm, wherein each pixel is de-noised when the depth value of each pixel bounded by the one or more pixels are not within a pre-defined depth value of the one or more pixels.

13. The non-transitory computer program product of claim 11, wherein the activity comprises any of a walking, a standing, a sitting, a sleeping, or combinations thereof.

* * * * *